United States Patent
Coppock et al.

(10) Patent No.: US 7,266,638 B2
(45) Date of Patent: Sep. 4, 2007

(54) SYSTEM, METHOD AND SOFTWARE FOR REPORTING LOGICAL VOLUME INFORMATION ON NETWORK ATTACHED STORAGE APPLIANCES

(75) Inventors: John C. Coppock, Austin, TX (US); Jacob Cherian, Austin, TX (US)

(73) Assignee: Dell Products L.P., Round Rock, TX (US)

(*) Notice: Subject to any disclaimer, the term of this patent is extended or adjusted under 35 U.S.C. 154(b) by 333 days.

(21) Appl. No.: 10/679,798

(22) Filed: Oct. 6, 2003

(65) Prior Publication Data
US 2005/0076178 A1   Apr. 7, 2005

(51) Int. Cl.
G06F 12/00 (2006.01)
(52) U.S. Cl. .......................................... 711/114; 714/24
(58) Field of Classification Search ................. 711/114
See application file for complete search history.

(56) References Cited

U.S. PATENT DOCUMENTS

| | | | | |
|---|---|---|---|---|
| 5,367,669 A | * | 11/1994 | Holland et al. ................. 714/7 |
| 5,835,700 A | * | 11/1998 | Carbonneau et al. ......... 714/44 |
| 5,966,510 A | | 10/1999 | Carbonneau et al. .... 395/183.2 |
| 6,384,842 B1 | | 5/2002 | DeKoning et al. ........... 345/734 |
| 6,834,326 B1 | * | 12/2004 | Wang et al. .................. 711/114 |
| 2002/0101711 A1 | * | 8/2002 | Gold ............................ 361/685 |
| 2003/0070043 A1 | * | 4/2003 | Merkey ....................... 711/114 |

FOREIGN PATENT DOCUMENTS

| | | |
|---|---|---|
| JP | 09330184 | 12/1997 |
| JP | 10187358 | 7/1998 |
| WO | 95/13581 | 5/1995 |

\* cited by examiner

*Primary Examiner*—Brian R. Peugh
*Assistant Examiner*—Hashem Farrokh
(74) *Attorney, Agent, or Firm*—Baker Botts L.L.P.

(57) ABSTRACT

A system, method and software for reporting logical volume information on software RAID (redundant array of independent disks) enabled storage devices is disclosed. In one embodiment, a volume manager may be queried to identify one or more software RAID volumes and to determine their operating state. The information handling system's operating system may be queried to identify the storage devices included on the system and their operating state. After correlating the software RAID volumes to respective storage devices, a worst case operating state between the software RAID volumes and the storage devices may be reported to a light emitting diode (LED) driver. The LED driver may then command one or more chassis LED to illuminate in a manner that communicates the worst case operating state of one or more of software RAID volumes.

16 Claims, 2 Drawing Sheets

SYSTEM, METHOD AND SOFTWARE FOR REPORTING LOGICAL VOLUME INFORMATION ON NETWORK ATTACHED STORAGE APPLIANCES

TECHNICAL FIELD

The present disclosure relates generally to information storage and, more particularly, to reporting operating status information on one or more information storage devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network attached storage (NAS) is one subset of information handling system technology devoted primarily to storing and provisioning data for a plurality of users. From a user perspective, NAS hardware is preferably cost effective to acquire and maintain as well as substantially continuously available or at least incurs minimal downtime. In certain respects, the achievement of availability and low cost maintenance may be furthered using some of the same mechanisms.

Today, organizations typically deploy one or more NAS devices that use RAID or redundant array of inexpensive/independent disks to achieve data availability. In practice, a RAID may be implemented in software or hardware. Software RAID is often used to reduce the costs of NAS RAID deployment. Hardware and software RAID generally may be employed to accomplish the same goals, however, each has its own nuances as to how it is treated by the operating system (OS).

In a hardware implementation, a RAID controller typically hides the information storage devices from the OS and creates an abstraction of storage called logical units that are exposed to the OS. To determine the status of a disk set, one or more calls to the RAID controller must typically be made. In software RAID implementations the information storage devices are typically exposed to the OS. In addition, RAID may be configured using a software driver included in the OS and RAID functionality is typically achieved at a volume level not a logical unit level. For example, a volume manager graphical user interface (GUI) in Microsoft Windows may be queried to ascertain the status of the software RAID volumes.

SUMMARY

In accordance with teachings of the present disclosure, a system, method and software are described for reporting logical volume information on network attached storage (NAS) appliances employing software-based redundant arrays of inexpensive disks (RAID).

In a first aspect, teachings of the present disclosure provide a computer readable medium including a program of instructions. The program of instructions is preferably operable to determine an operating status of at least one software RAID volume on an information handling system. The program of instructions is also preferably operable to operate at least one user observable light emitting diode (LED) in a manner indicative of the software RAID volume operating status.

In another aspect, teachings of the present disclosure provide an information handling system including a processor, a memory, an information storage device operably coupled to the processor and the memory, and at least one LED operably coupled to the information storage device. The information handling system preferably also includes a program of instructions storable in the memory and executable by the processor. The program of instructions is preferably operable to obtain an operational state for one or more software-based RAID volumes on the information storage device and command operation of the LED in a manner reflective of the software-based RAID volume operational state.

In a further aspect, teachings of the present disclosure provide a method for reporting volume information on one or more RAIDs in an information handling system having one or more information storage device drives. In one embodiment, the method preferably includes identifying one or more RAID volumes on the information handling system. The method preferably also includes identifying the information storage device drives coupled to the information handling system and correlating the RAID volumes to the information storage device drives. Further, the method preferably also includes determining and reporting an initial worst case operational state between the identified RAID volumes and the identified information storage device drives to a LED driver, the LED driver is preferably operable to operate a NAS appliance chassis LED in accordance with a last reported worst case operational state. The method further includes determining a current worst case operational state between the RAID volumes and the information storage device drives and reporting the current worst case operational state to the LED driver.

In one aspect, the present disclosure provides the technical advantage of providing a user with quick access to the status of one or more software RAID volumes.

In another aspect, the present disclosure provides the technical advantage of reducing RAID downtime through the provision of external RAID status indicators for software RAID that emulates what is available for hardware RAID systems.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
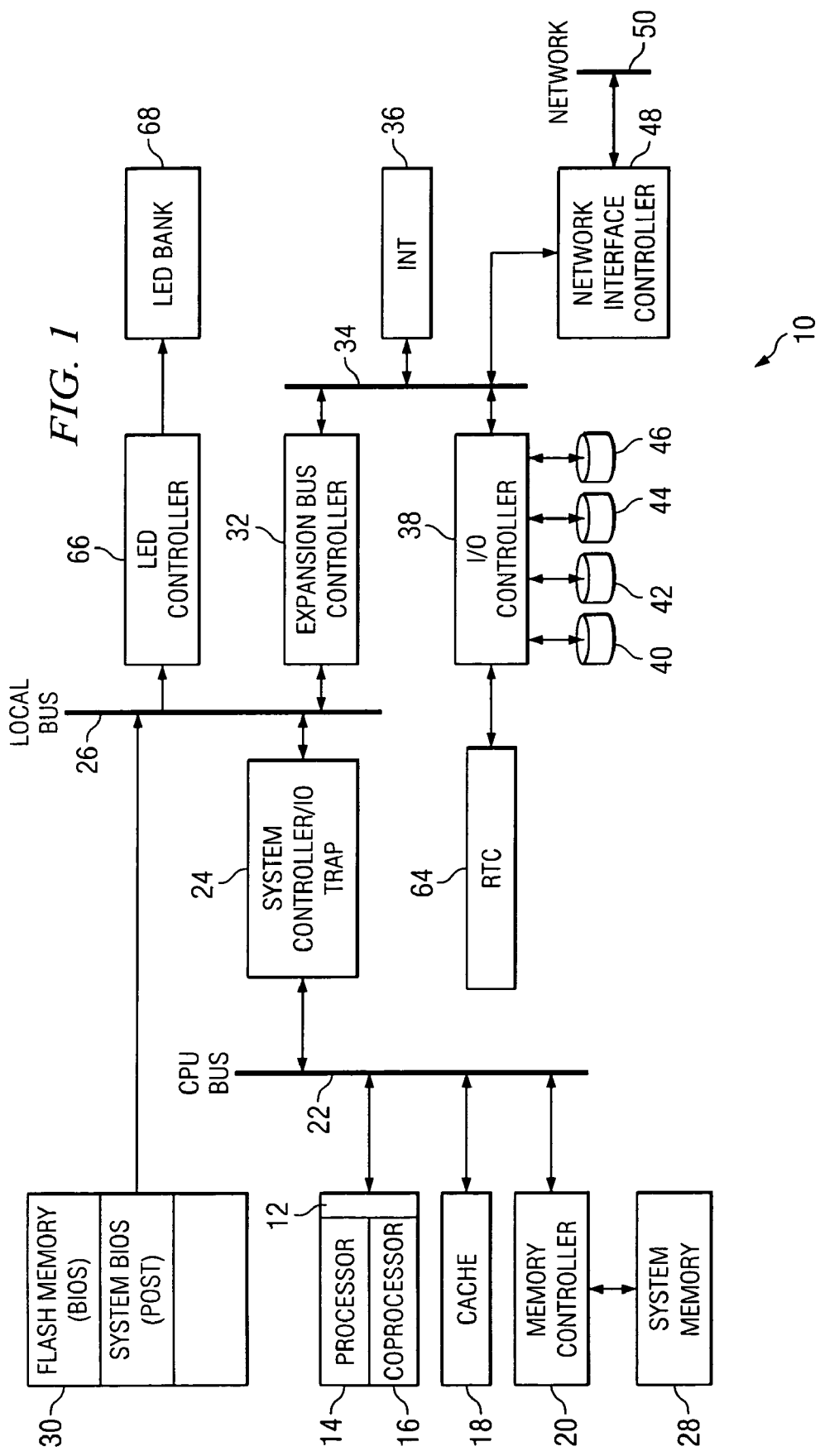
FIG. 1 is a block diagram depicting an exemplary embodiment of an information handling system, according to teachings of the present disclosure.
Figure 2:
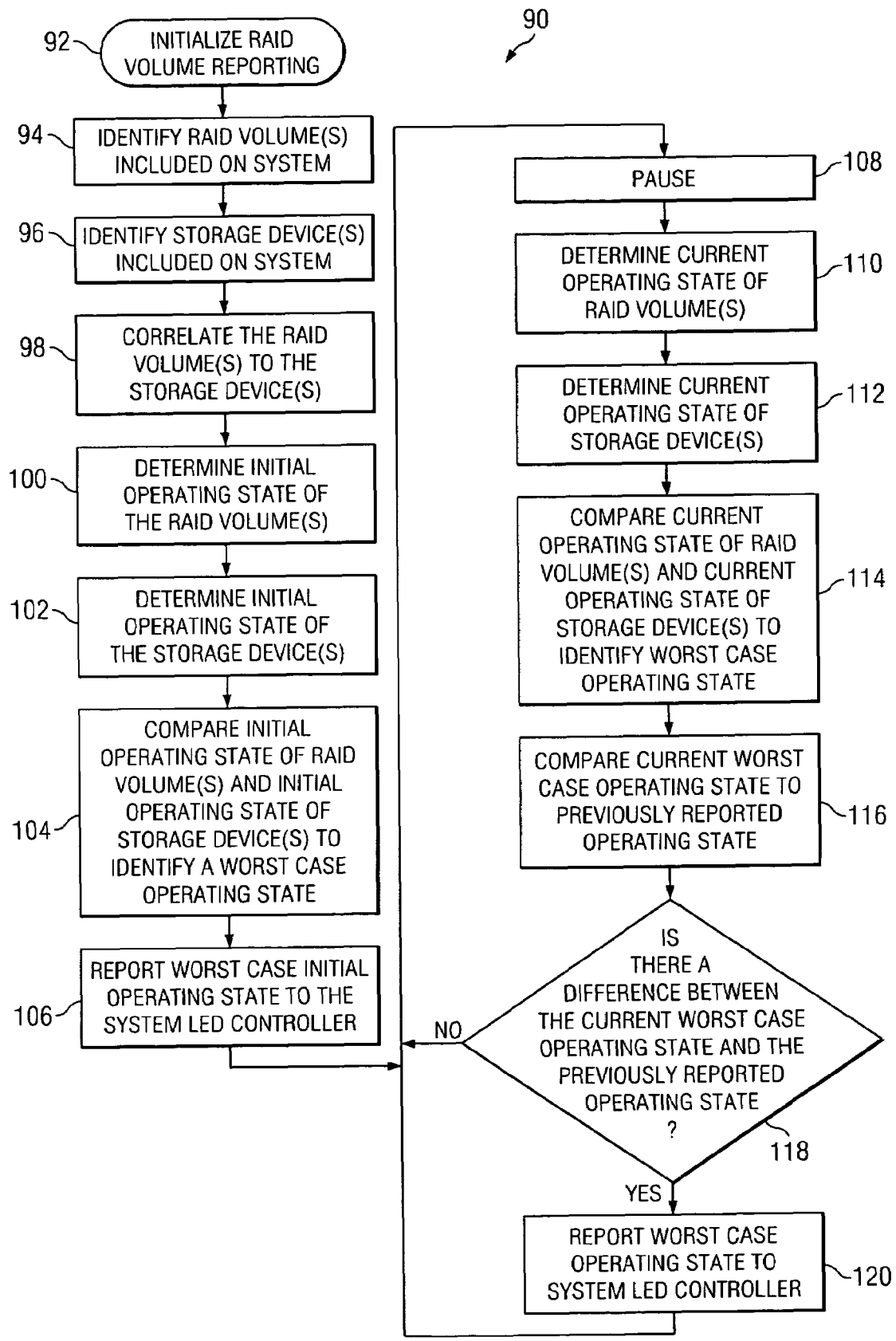
FIG. 2 is a flow diagram depicting one embodiment of a method for reporting logical volume information on one or more software RAID volumes, according to teachings of the present disclosure.

Preferred embodiments and their advantages are best understood by reference to FIGS. 1 through 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring first to FIG. 1, a block diagram of an information handling system, such as a network attached storage (NAS) appliance, is shown, according to teachings of the present disclosure. Information handling system 10 preferably includes at least one microprocessor or central processing unit (CPU) 12. CPU 12 may include processor 14 for handling integer operations and coprocessor 16 for handling floating point operations. CPU 12 is preferably coupled to cache 18 and memory controller 20 via CPU bus 22. System controller I/O trap 24 preferably couples CPU bus 22 to local bus 26 and may be generally characterized as part of a system controller. Main memory 28 of dynamic random access memory (DRAM) modules is preferably coupled to CPU bus 22 by a memory controller 20.

Basic input/output system (BIOS) memory 30 is also preferably coupled to local bus 26. FLASH memory or other nonvolatile memory may be used as BIOS memory 30. A BIOS program (not expressly shown) is typically stored in BIOS memory 30. The BIOS program preferably includes software which facilitates initialization of information handling system 10 devices such as a keyboard (not expressly shown), a mouse (not expressly shown), or other devices as well as aids in the initial loading of the operating system.

Bus interface controller or expansion bus controller 32 preferably couples local bus 26 to expansion bus 34. Expansion bus 34 may be configured as an Industry Standard Architecture ("ISA") bus or a Peripheral Component Interconnect ("PCI") bus. Other NAS deployments may include alternative expansion bus technologies.

Interrupt request generator 36 is also preferably coupled to expansion bus 34. Interrupt request generator 36 is preferably operable to issue an interrupt service request over a predetermined interrupt request line in response to receipt of a request to issue interrupt instruction from CPU 12.

I/O controller 38 is also preferably coupled to expansion bus 34. I/O controller 38 preferably interfaces to integrated drive electronics (IDE) hard drives 40, 42, 44 and 46.

Network interface controller 48 is preferably provided and enables information handling system 10 to communicate with communication network 50, e.g., an Ethernet network. Communication network 50 may include a local area network ("LAN"), wide area network ("WAN"), Internet, Intranet, wireless broadband or the like. Network interface controller 48 preferably forms a network interface for communicating with other information handling systems (not expressly shown) coupled to communication network 50. An information handling system's communication components generally include hardware as well as software components. Examples of hardware components include network interface controller 48 and communication network 50. Examples of software components specific to NAS may include file server services and network administration services.

Real-time clock (RTC) 64 may also be coupled to I/O controller 38. Real-time clock 64 may be programmed to generate an alarm signal at a predetermined time as well as to perform other operations.

In a preferred embodiment, information handling system 10 preferably includes LED controller 66 and LED bank 68. LED controller 66 may be coupled to one or more of system buses 22, 26 and 34. LED bank 68 preferably includes at least one LED viewable by a user. LED bank may include a plurality of LEDs disposed on the chassis (not expressly shown) of information handling system. LED controller 66 is preferably operable to receive one or more instructions directed to illuminating one or more LEDs in LED bank 68 in accordance with an operating state of one or more aspects of information handling system 10 and in accordance with teachings of the present invention. The manner in which LED controller 66 and LED bank 68 may be leveraged to communicate the status of one or more volumes of a software RAID on information handling system 10 will be discussed in greater detail below with regard to FIG. 2.

Software-based RAID implementations are typically either operating system-based, or they are application programs that run on a server or NAS appliance. Most operating system RAID implementations provide support for RAID-0, RAID-1, and RAID-5. In software RAID deployments, most array operations and management functions are controlled by the array software running on the host CPU. In contrast, most hardware-based arrays are implemented directly on a host-based RAID adapter which typically tightly couples the array functions with the disk interface. This design also allows many of the array operations and management of the RAID volumes to be off-loaded from the host CPU and instead, be executed locally on an embedded-processor.

While software-based RAID systems generally offer a lower cost, they tend to monopolize system resources. Software-based RAIDs typically occupy host memory, consume CPU cycles and are substantially operating system dependent. Software is also required for the array to boot and some implementations require a separate boot drive not included in the array.

In accordance with teachings of the present disclosure, by utilizing volume manager application program interfaces (API) and a LED driver interface, network attached storage (NAS) appliances using software-based RAIDs can appear as hardware-based RAIDs from an appliance chassis LED point of view. One method for effecting this appearance of hardware RAID in a software RAID implementation is shown generally in FIG. 2.

In general, according to teachings of the present disclosure, a method for reporting the logical volume status of one or more network attached storage appliances may begin by placing one or more calls to a logical volume manager API included on a network attached storage appliance. Calls to the logical volume manager APIs are generally to determine the status of one or more software RAID disk sets on a NAS appliance. Following a determination of the status of software RAIDs on the NAS appliance, the logical volumes are preferably correlated to any information storage device included on the NAS appliance. In some instances, the state of the physical information handling system disk drive may be operational, but the logical RAID volume that resides on a given disk drive may be degraded or in a failed state.

In addition to determining the status of one or more software RAID volumes on the NAS appliance, the status of the one or more information storage devices deployed thereon is preferably also determined. In one aspect, the operating system included on the NAS appliance may be utilized to query the status of the physical information storage device drives. Other means for determining the status of one or more information storage device drives may be employed without departing from the spirit and scope of teachings of the present disclosure.

Having obtained both the status of the logical volumes of the software RAIDs and the status of the information storage devices of a given NAS appliance as well as having correlated the one or more software RAID volumes to the one or more device drives, the state of the correlated volumes and drives may be reported to a user via one or more user observable LEDs preferably included on the NAS appliance chassis, for example. In one embodiment of the present disclosure, the worst case status or state from the logical volume manager query and the hardware device status query is preferably reported to an LED driver and/or controller of the NAS appliance. In a preferred embodiment, the LED driver/controller will then operate one or more NAS appliance chassis LEDs in a manner reflective of the state or status of one or more of the software RAID volumes or information storage devices. Once the worst case status or state has been reported to the LED driver/controller, a device driver routine is preferably called allowing the chassis LED or LEDs to be set according to the desired state or status reporting. In an effort to keep the status or state information current, the method generally described above is preferably repeated in a poll loop, allowing for discovery of a subsequent failure or recovery of a software RAID volume or information storage device.

Referring now to FIG. 2, a flow diagram depicting one embodiment of a method for reporting logical volume information of a NAS appliance is shown. Upon initialization of RAID volume reporting at 92, method 90 preferably proceeds to 94.

At 94, method 90 preferably identifies one or more RAID volumes included on information handling system 10. As mentioned above, one method for identifying the one or more RAID volumes included on information handling system 10, such as a NAS appliance, may include querying a logical volume manager preferably operating on information handling system 10.

In one embodiment of a method according to teachings of the present disclosure, following identification of the one or more RAID volumes included on information handling system 10, method 90 preferably proceeds to 96. At 96, method 90 preferably provides for the identification of one or more information storage devices, such as hard drive devices 40, 42, 44 or 46, preferably included on information handling system 10. As mentioned above, an operating system running on a NAS appliance, such as information handling system 10, may be queried to identify the one or more information storage devices preferably included.

Once the RAID volumes and information storage devices of information handling system 10 have been identified, method 90 preferably proceeds to 98. At 98, method 90 preferably provides for the correlation of the one or more RAID volumes to the one or more information storage devices included on information handling system 10. In one embodiment, correlating software RAID volumes to physical information storage devices may include establishing which software RAID volume is stored on which physical information storage devices, as well as other correlating methodologies. In an alternative embodiment, correlation of the one or more RAID volumes to the one or more information storage devices of information handling system 10 may be implemented at another stage of method 90, or otherwise.

At 100 and 102, method 90 preferably provides for a determination of an initial operating state of the one or more software RAID volumes identified at 94 and a determination of an initial operating state of the one or more information storage devices identified at 96, respectively. In one embodiment, a determination of operating state for the one or more software RAID volumes or the one or more information storage devices of information handling system 10 may be performed separate and apart from software RAID volume and storage device identification at 94 and 96, respectively. In an alternate embodiment, identification of the one or more software RAID volumes included on information handling system 10 and a determination as to the operating state of the one or more software RAID volumes may be incorporated into a joint or single step or operation. Similarly, identification of the one or more information storage devices included on information handling system 10 as well as a determination as to the operating state of the one or more information storage devices may be incorporated into a joint or single step or operation.

Once the one or more software RAID volumes, information storage devices as well as their operating states have been determined, method 90 preferably provides for a comparison of the operating state of the various RAID volumes and the operating state of the information storage devices correlated above at 98, at 104. For example, at 104, method 90 may provide for a comparison between an initial operating state of the one or more software RAID volumes and the initial operating state of their one or more correlated information storage devices to identify a worst case operating state. For example, if a given information storage device is determined at 102 to be in good operating condition, however, a software RAID volume correlated to that same information storage device is determined at 100 to be nonoperational, the nonoperational state of the software RAID volume would be selected as the worst case operating state between the correlated objects. Once a worst case operating state has been identified at 104, method 90 preferably proceeds to 106 where the worst case operating state may be reported to LED controller 66 and/or an associated LED driver (not expressly shown).

Depending on the implementation of information handling system 10, reporting of the worst case operating state to LED controller 66, and/or an associated LED driver, may initiate one or more subsequent actions. For example, upon receipt of the worst case operating state by system LED controller 66, LED controller 66 may command a LED driver to operate one or more chassis LED in LED bank 68 and associated with the software RAID volume or information storage device for which LED controller 66 received the worst case operating state in a certain manner. A failed software RAID volume or a nonoperational information storage device may be indicated to a user via a chassis LED, for example, by illuminating an associated LED with a particular flashing pattern, using a particular hue, or otherwise. As a result of 106, method 90 preferably provides the user with a quick reference as to the status of one or more software RAID volumes included on a selected information handling system 10.

Once the initial operating status of the one or more software RAID volumes and one or more information storage devices have been reported at 106, and the associated LEDs operated as desired, method 90 may temporarily pause at 108. In one embodiment, RTC 64 of information handling system 10 may be employed to pause method 90 at 108 for a selected time period, i.e., method 90 may enter a sleep state at 108. In an alternate embodiment, method 90 may pause at 108 for receipt of a change in status notification of one or more RAID volumes or in one or more of information storage devices 40, 42, 44 and 46. Such a change in status notification may be communicated by a component of the operating system or logical volume manager of information handling system 10, as well as via another reporting mechanism. Other embodiments of pausing method 90 at 108, such as an implementation combining a sleep timer with early awake capabilities in the form of a change in status notification, may be implemented without departing from the spirit and scope of the present disclosure.

Upon departing its pause state at 108, method 90 preferably proceeds to 110 and 112. At 110, method 90 preferably provides for a determination as to the current operating state of the one or more software RAID volumes of information handling system 10. At 112, method 90 preferably provides for a determination as to the current operating state of the one or more information storage devices of the information handling system 10. Similar to those operations performed at 104, at 114 method 90 preferably provides for a comparison of the current operating state of the one or more software RAID volumes and the current operating state of the one or more information storage devices included on information handling system 10 to identify a current worst case operating state, again between correlated objects.

In one embodiment, method 90 preferably proceeds from 114 to 116 where the current worst case operating state between the one or more software RAID volumes and their correlated one or more information storage devices of information handling system 10 is compared to the previously reported operating state of such correlated objects, such as at 106. In such an embodiment, method 90 preferably proceeds to 118 where it is determined whether the current worst case operating state is different than the previously reported operating state. If at 118 it is determined that the current worst case operating state and the previously reported worst case operating state are the same, method 90 preferably returns to 108 where method 90 may again be paused. However, if at 118 it is determined that there is a difference between the current worse case operating state and the previously reported worse case operating state, method 90 preferably proceeds to 120 where the current worst case operating state may be reported to system LED controller 66 such that one or more chassis LED in LED bank 68 may be illuminated to reflect the current worst case operating state between one or more of the software RAID volumes and information storage devices.

In an alternate embodiment of method 90, the operations at 118 may be omitted. For example, at 116 method 90 may provide for a comparison of the current worst case operating state between the one or more software RAID volumes and their one or more correlated information storage device counterparts and then proceed directly to 120. Again, at 120, the current worst case operating state of the correlated software RAID volumes and information storage devices of information handling system 10 may be reported to the system LED controller 66 such that one or more chassis LED may be illuminated in accordance with such worst case operating state.

Although the disclosed embodiments have been described in detail, it should be understood that various changes, substitutions and alterations can be made to the embodiments without departing from their spirit and scope.

What is claimed is:

1. A method for reporting volume information on one or more redundant arrays of independent disks (RAID) in an information handling system having one or more storage device drives, the method comprising:
   identifying a software RAID volume on the information handling system;
   correlating the RAID volume to a storage device drive;
   determining an operating state of the identified RAID volume;
   determining an operating state of the correlated storage device drive;
   comparing the determined operating state of the identified RAID volume with the determined operating state of the storage device drive;
   based on the result of the comparison, determining a worst case operational state between the identified RAID volume and the storage device drive; and
   operating a chassis LED in accordance with the worst case operational state.

2. The method of claim 1, further comprising:
   determining, prior to operating the chassis LED in accordance with the worst case operational state, whether a current worst case operational state is different than a last reported worst case operational state; and
   reporting the current worst case operational state to the LED driver in response to a difference between the current worst case operational state and the last reported worst case operational state.

3. The method of claim 1, wherein identifying the network storage devices includes identifying one or more network attached storage appliances.

4. The method of claim 1, wherein determining said worst case operational state comprises, responsive to determining an operating state of a software RAID volume to be non-operational and determining an operating state of a storage device drive on which at least a portion of the software RAID volume is stored to be operational, selecting the nonoperational state of the software RAID volume as the worst case operational state.

5. An information handling system, comprising:
   a processor;
   a memory operably coupled to the processor;
   an information storage device operably coupled to the processor and the memory;
   at least one light emitting diode (LED) operably coupled to the information storage device; and a program of instructions storable in the memory and executable by the processor, the program of instructions operable to:
  determine an operational state for one or more software-based RAID (redundant array of independent disks) volumes on the information storage devices;
  determine an operational state of one or more information storages devices correlated to the one or more software-based RAID volumes;
  compare the determined operational state of the one or more software-based RAID volumes with the determined operational state of the one or more information storage devices; and
  command operation of the LED in a manner reflective of the results of the comparison.

6. The information handling system of claim 5, further comprising the program of instructions operable to communicate with a logical volume manager to determine the operating state of the one or more information handling system software-based RAID volumes.

7. The information handling system of claim 5, further comprising the program of instructions operable to correlate the one or more software-based RAID volumes to the one or more information storage devices.

8. The information handling system of claim 7, further comprising the program of instructions operable to identify a least preferred operational state from the operational state of the one or more software-based RAID volumes and the operational state of the one or more information storage devices.

9. The information handling system of claim 8, further comprising the program of instructions operable to operate the LED in accordance with the least preferred operational state.

10. The information handling system of claim 9, further comprising the program of instructions operable to:
  periodically poll the operational state of the software-based RAID volumes and the information storage devices;
  determine a new least preferred operational state between the software-based RAID volume operational state and the information storage device operational state;
  determine whether the new least preferred operational state is different from a previously identified least preferred operational state; and
  alter operation of the LED in response to a difference between the new least preferred operational state and the previously identified operational state.

11. A computer readable medium comprising a program of instructions, the program of instructions operable to:
  determine an operating status of at least one software redundant array of independent disks (RAID) volume on an information handling system;
  determine an operational state of at least one storages device correlated to the at least one software RAID volume;
  compare the determined operational state of the at least one software RAID volume with the determined operational state of the at least one storage device; and
  operate at least one user observable light emitting diode (LED) operably coupled to an information storage device in a manner indicative of the results of the comparison.

12. The computer readable medium of claim 11, further comprising the program of instructions operable to determine a last operating status and a current operating status of the at least one software RAID volume.

13. The computer readable medium of claim 12, further comprising the program of instructions operable to alter operation of the at least one user observable LED in response to a difference between the current operating status and the last operating status of the at least one software RAID volume.

14. The computer readable medium of claim 11, further comprising the program of instructions operable to:
  identify a worst case operating status between the at least one software RAID volume and the at least one storage device; and
  operate the at least one user observable LED in accordance with the worst case operating status.

15. The computer readable medium of claim 11, further comprising the program of instructions operable to establish a correlation between the at least one software RAID volume and the at least one storage device.

16. The computer readable medium of claim 11, further comprising the program of instructions operable to communicate the operating status of the at least one software RAID volume to an LED driver, the LED driver operable to command operation of the at least one user observable LED.

* * * * *